(12) United States Patent
Yang et al.

(10) Patent No.: US 6,360,948 B1
(45) Date of Patent: Mar. 26, 2002

(54) METHOD OF READING TWO-DIMENSIONAL CODE AND STORAGE MEDIUM THEREOF

(75) Inventors: Xuhua Yang, Chiryu; Hisashi Shigekusa, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/447,885

(22) Filed: Nov. 24, 1999

(30) Foreign Application Priority Data

Nov. 27, 1998 (JP) .......................................... 10-337773

(51) Int. Cl.$^7$ ................................................ G06K 7/10
(52) U.S. Cl. ..................... 235/462.1; 235/375; 235/385; 235/462.09; 235/462.14; 235/462.19; 235/462.25
(58) Field of Search ............................. 235/462.1, 375, 235/385, 461, 462.09, 462.11, 462.12, 462.14, 462.17, 462.19, 462.24, 462.25, 462.31

(56) References Cited

U.S. PATENT DOCUMENTS

| | | | |
|---|---|---|---|
| 5,073,954 A | * 12/1991 | Van Tyne et al. | 235/436 |
| 5,404,003 A | * 4/1995 | Smith | 235/462 |
| 5,487,115 A | * 1/1996 | Surka | 265/462 X |
| 5,612,524 A | * 3/1997 | Sant'Anselmo et al. | 235/494 |
| 5,686,718 A | 11/1997 | Iwai et al. | 235/494 |
| 5,691,527 A | 11/1997 | Hara et al. | 235/456 |
| 5,726,435 A | 3/1998 | Hara et al. | 235/294 |
| 5,756,981 A | * 5/1998 | Roustaei et al. | 235/462 |
| 6,082,619 A | * 7/2000 | Ma et al. | 235/462.1 |
| 6,201,901 B1 | * 3/2001 | Zhou et al. | 382/306 |

FOREIGN PATENT DOCUMENTS

| | | | |
|---|---|---|---|
| JP | 406111042 A | * 4/1994 | |
| JP | 7-254037 | 10/1995 | |
| JP | 8-180125 | 7/1996 | |
| JP | 8-185429 | 7/1996 | |
| JP | 10-208001 | 8/1998 | |

* cited by examiner

Primary Examiner—Michael G. Lee
Assistant Examiner—Daniel I Walsh
(74) Attorney, Agent, or Firm—Pillsbury Winthrop LLP

(57) ABSTRACT

A method of reading information out of a two-dimensional code made up of a matrix of cells having a given optical pattern is provided. The two-dimensional code has location symbols used to locate the two-dimensional code and alignment symbols used to locate the cells. The method first calculates a central position of each of the alignment symbols in an image of the two-dimensional code using a predetermined positional relation to the location symbols and selects one of reference patterns which matches up with an optical pattern formed with a pixel lying at the calculated central position of the alignment symbol and surrounding pixels. The method specifies an actual central position of each of the alignment symbols in the image of the two-dimensional code using the matched reference pattern. This compensates for a locational error between the calculated central position and the actual central position of each of the alignment symbols due to deformation of the image taking place, for example, when the two-dimensional code is printed on a round object.

16 Claims, 12 Drawing Sheets

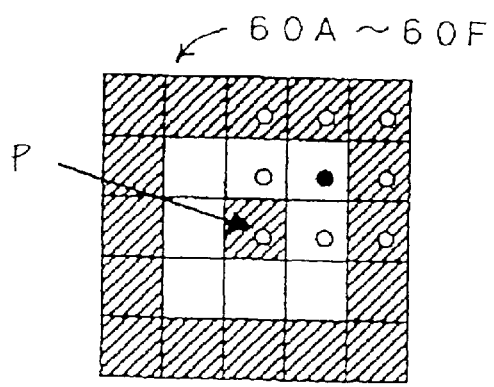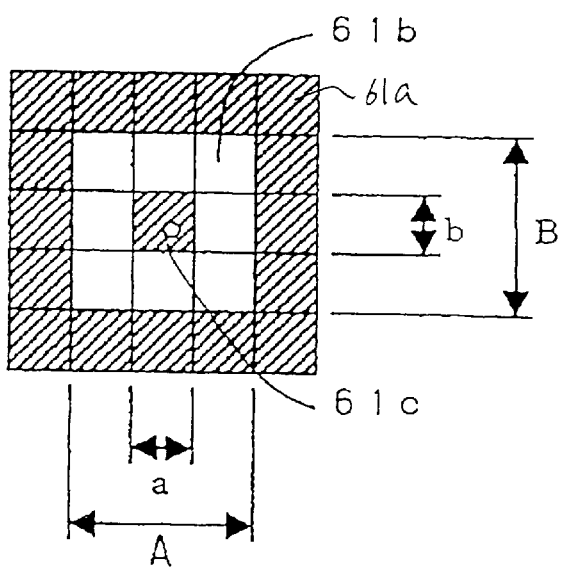
FIG. 14(a)  FIG. 14(b)
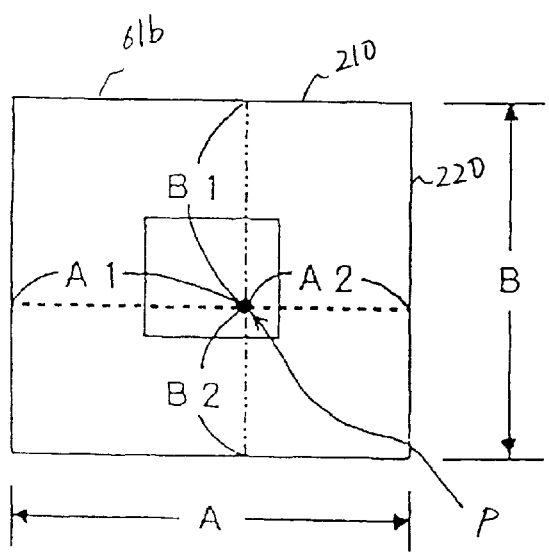
FIG. 14(c)

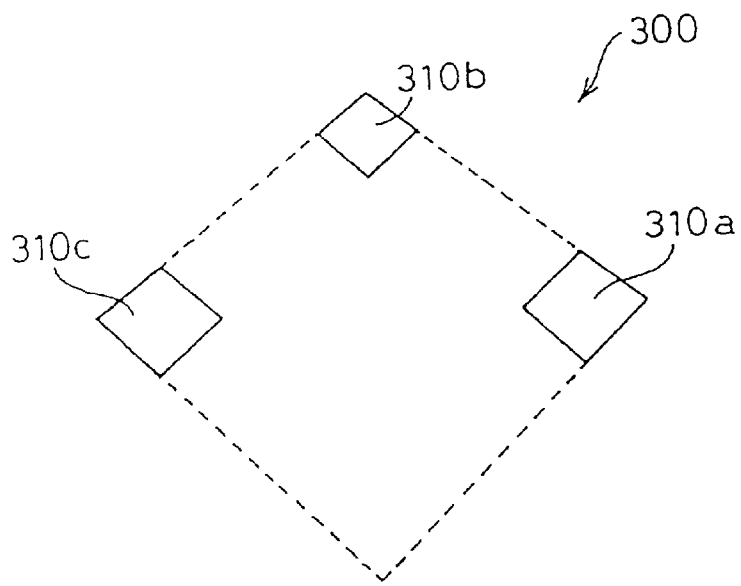
FIG. 18 (a) PRIOR ART
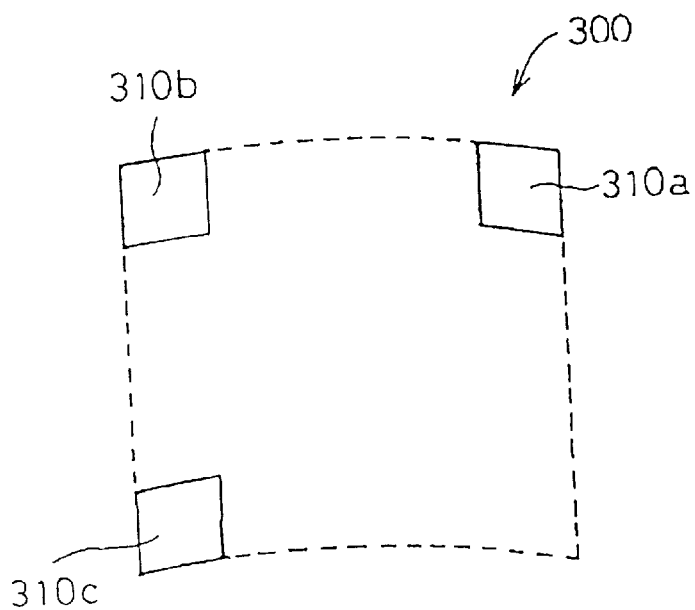
FIG. 18 (b) PRIOR ART

METHOD OF READING TWO-DIMENSIONAL CODE AND STORAGE MEDIUM THEREOF

BACKGROUND OF THE INVENTION

1. Technical Field of the Invention

The present invention relates generally to a method of reading information optically out of a two-dimensional code made up of a matrix of data cells in a decreased time and a storage medium storing a program used to implement such a method.

2. Background Art

U.S. Pat. No. 5,726,435 filed Mar. 10, 1998, assigned to the same assignee as that of this application teaches a two-dimensional code used in inputting coded information into a computer, for example.

Typical two-dimensional codes have a two-dimensional spread, as shown in FIG. 16(b), which can carry a large amount of information in a narrow area as compared with a bar code, as shown in FIG. 16(a), but the structure thereof is complex.

FIG. 17 shows one example of two-dimensional codes. The two-dimensional code 300 includes three location symbols 310a, 310b, and 310c and arrays of timing cells 320a and 320b. The location symbols 310a to 310c are used in locating the two-dimensional code 300 and each consist geometrically of a plurality of squares different in size. The arrays of timing cells 320a and 320b are each disposed between adjacent two of the location symbols 310a to 310c and consist of a plurality of white and black cells arranged in a reference pattern that are used as indices of data cells arranged in a data field 330.

The two-dimensional code 300 is made up of a square matrix of n×n cells. Each of the location symbols 310a to 310c consists of a square frame 312 formed with four sides each consisting of 7 cells, a white square frame 314 formed with four sides each consisting of 5 cells, and a black square 316 consisting of 3×3 cells formed on the central portion of the white square frame 314.

When each of the location symbols 310a to 310c is scanned through an optical reader along any line passing through the center thereof, an optical signal pattern which has a brightness component ratio of black:white:black:white:black=1:1:3:1:1 is detected. Thus, when an optical signal pattern having that brightness component ratio is detected during scanning of the two-dimensional code 300, it may be determined as a candidate pattern for any one of the location symbols 310a to 310c. Specifically, when three optical signal patterns each having a brightness component ratio of 1:1:3:1:1 are detected, it may be determined that the two-dimensional code 300 lies on a square area defined by the three optical signal patterns.

The data filed 330 consists of data cells (not shown for the brevity of illustration) each formed with a black or white square indicating logical 0 or 1 of a binary-coded data. Two-dimensional coordinates of each data cell are geometrically calculated in a known algorithm by using the centers of the location symbols 310a to 310c and the timing cells 320a and 320b as indices of the coordinates.

When the two-dimensional code 300 is scanned optically from a slant direction undesirably or when the two-dimensional code 300 printed on a curved surface of an object is scanned optically, it will cause a deformed image of the two-dimensional code 300, as shown in FIG. 18(a), to be captured. Additionally, when the two-dimensional code 300 is printed on the surface of a round bottle, for example, it will cause, as shown in FIG. 18(b), both sides of the two-dimensional code 300 to be deformed greatly. The deformation of the image of the two-dimensional code 300 will result in shift between the actual center and the center of each data cell geometrically calculated in the above manner. If the shift is greater than half a size of each data cell, it produces an error in reading the two-dimensional code 300. The degree of the deformation producing such an error increases as the size of the two-dimensional code 300 is increased for carrying more information.

In order to avoid the above problem, Japanese Patent First Publication No. 10-208001 assigned to the same assignee as that of this application teaches a method of reading information out of a two-dimensional code correctly even if a captured image of the two-dimensional code is deformed. The two-dimensional code has location symbols used in locating a data field and alignment symbols (also called auxiliary symbols) each arranged in a predetermined positional relation to the location symbols. The position of each data cell in the data field in the image of the two-dimensional code is specified by determining the central positions, shapes, and arrangement of the location symbols and the alignment symbols. The central position of each of the alignment symbols is determined by mathematically estimating a central position based on the shape of cells of the location symbols and the central positions of the location symbols and scanning an image of the alignment symbol near the estimated central position to find an actual center of the alignment symbol. One example of such a method of determining the actual center of each alignment symbol is also taught in Japanese Patent First Publication No. 8-185429, however, it has the drawback in that many pixels should be scanned, thus taking a large amount of time to locate each alignment symbol, which will result in an increase in time required for reading information out of the two-dimensional code.

SUMMARY OF THE INVENTION

It is therefore a principal object of the present invention to avoid the disadvantages of the prior art.

It is another object of the present invention to provide a method of reading information out of a two-dimensional code in a decreased time.

According to one aspect of the invention, there is provided a method of reading information out of a two-dimensional code made up of a matrix of cells having a given optical pattern. The two-dimensional code has at least one location symbol used to locate the two-dimensional code and at least one alignment symbol used to locate the cells. The method comprises steps of: (a) capturing an image around the two-dimensional code in a bit mapped pattern; (b) detecting a position of the location symbol to determine a position of the two-dimensional code in the captured image; (c) calculating a central position of the alignment symbol in the captured image mathematically using a predetermined positional relation of the alignment symbol to the location symbol; (d) selecting a dot in the captured image lying at the calculated central position of the alignment symbol as a reference brightness check dot and dots lying in some of the cells around one of the cells of the captured image in which the reference brightness check dot exists as surrounding brightness check dots to define an alignment symbol optical pattern with a combination of the reference brightness check dot and the surrounding brightness check dots; (e) comparing the alignment symbol optical pattern with a plurality of reference optical patterns each formed with one of possible combinations of one of the cells lying at an actual central position of the alignment symbol and as many cells arranged adjacent the one of the cells as the surrounding brightness check dots to select one of the reference optical patterns matching up with the alignment symbol optical pattern; (f) correcting the calculated central position of the alignment symbol based on a position of one of the surrounding brightness check dots in the captured image corresponding to the one of the cells of the matched reference optical pattern at the actual central position of the alignment symbol and a geometry of the alignment symbol to determine an actual central position of the alignment symbol in the captured image; (g) determining positions of the cells of the two-dimensional code in the captured image based on at least one of the position of the location symbol and the actual central position of the alignment symbol in the captured image; and (h) reading the cells of the two-dimensional code in the captured image optically to decode the information carried by the two-dimensional code.

In the preferred mode of the invention, the alignment symbol has one of a pattern formed with a central dark cell, an intermediate square frame which surrounds the central dark cell, consists of an array of light pixels, and has a width equivalent to one cell, and an outer square frame which surrounds the intermediate square frame, consists of an array of dark cells, and has a width equivalent to one cell and a pattern formed with a central light cell, an intermediate square frame which surrounds the central dark cell, consists of an array of dark pixels, and has a width equivalent to one cell, and an outer square frame which surrounds the intermediate square frame, consists of an array of light cells, and has a width equivalent to one cell. Each of the reference optical patterns consists of a matrix of 3×3 cells. The number of the reference optical patterns is nine.

Each of the cells of the two-dimensional code is represented in the captured image by a matrix of a plurality of pixels. Each of the reference brightness check dot and the surrounding brightness check dots is represented by one pixel. The alignment symbol optical pattern is formed with a combination of brightness levels of pixels representing the reference brightness check dot and the surrounding brightness check dots. The brightness level of each of the pixels is determined by considering brightness levels of pixels surrounding thereof into account.

Each of the pixels representing the captured image of the two-dimensional code is one of light and dark pixels. The brightness level of each of the pixels representing the reference brightness check dot and the surrounding brightness check dots is determined based on which of the number of light pixels and the number of dark pixels is greater in an area surrounding the each of the pixels.

The method further comprises the step of determining whether light and dark pixels are mixed in a given area around the reference brightness check dot or not. If it is determined that the light and dark pixels are mixed in the given area, the reference brightness check dot is shifted by a given distance in a given direction determined based on a geometry and a brightness pattern of the alignment symbol to a place of the captured image of the two-dimensional code where there is no mix of light and dark pixels, after which the brightness level of each of the pixels representing the reference brightness check dot and the surrounding brightness check dots is determined.

The given direction in which the reference brightness check dot is shifted may be a direction where the number of either of light pixels and dark pixels in the given area around the shifted reference brightness check dot is expected to increase.

The given direction in which the reference brightness check dot is shifted may alternatively be a direction toward one of a collection of light pixels and a collection of dark pixels in the given area around the reference brightness check dot which forms a portion of the intermediate square frame of the two-dimensional code.

The given distance by which the reference brightness check dot is shifted may be equivalent to a given number of pixels that is identical with a given fraction of one cell.

The given distance by which the reference brightness check dot is shifted is equivalent to a given number of pixels that is identical with half a cell.

The given distance by which the reference brightness check dot is shifted may alternatively be equivalent to a given number of pixels regardless of a size of the cells.

According to another aspect of the invention, there is provided a method of reading information out of a two-dimensional code which is made up of a matrix of cells having a given optical pattern and which has location symbols used to locate the two-dimensional code and alignment symbols used to locate the cells. A first one of the alignment symbols is provided at a position on the two-dimensional code which is specified in a given positional relation to the location symbols. The method comprises the steps of: (a) capturing an image around the two-dimensional code in a bit mapped pattern; (b) detecting positions of the location symbols to determine a position of the two-dimensional code in the captured image; (c) calculating a central position of the first alignment symbol in the captured image mathematically using the given positional relation to the location symbols; (d) calculating a central position of a second one of the alignment symbols in the captured image mathematically using a positional relation to the first alignment symbol and the location symbols; (e) selecting a dot in the captured image lying at the calculated central position of each of the alignment symbols as a reference brightness check dot and dots lying in some of the cells of the captured image located around one of the cells in which the reference brightness check dot exists as surrounding brightness check dots to define an alignment symbol optical pattern with a combination of the reference brightness check dot and the surrounding brightness check dots; (f) comparing the alignment symbol optical pattern of each of the alignment symbols with a plurality of reference optical patterns each formed with one of possible combinations of one of the cells lying at an actual central position of each of the alignment symbols and as many cells arranged adjacent the one of the cells as the surrounding brightness check dots to select one of the reference optical patterns matching up with a corresponding one of the alignment symbol optical patterns; (g) determining a central position of each of the alignment symbols in the captured image based on a position of one of the surrounding brightness check dots corresponding to the one of the cells of the matched reference optical pattern at the actual central position of a corresponding one of the alignment symbols and a geometry of the corresponding one of the alignment symbols; (h) determining a position of each of the cells of the two-dimensional code in the captured image based on the position of one of the location symbols or the actual central position of one of the alignment symbols located near a corresponding one of the cells in the captured image; and (i) reading the cells of the two-dimensional code in the captured image optically to decode the information carried by the two-dimensional code.

In the preferred mode of the invention, the method further comprises the step of calculating a central position of a third one of the alignment symbols in the captured image mathematically using a positional relation to the first and second alignment symbols.

The two-dimensional code also has a format code which is located in a given positional relation to one of the location symbols and which carries information about an arrangement of the alignment symbols in the two-dimensional code. The method further comprises the steps of, after the position of the two-dimensional code is determined, detecting the format code based on the positions of the detected location symbols and reading the information out of the format code about the arrangement of the alignment symbols. The central positions of the alignment symbols are calculated based on the information read out of the format code.

The format code also carries information about the number of the cells in the two-dimensional code. The method further comprises the steps of, after the position of the two-dimensional code is determined, detecting the format code based on the positions of the detected location symbols and reading the information out of the format code about the number of the cells in the two-dimensional code. The positions of the cells are determined based on the read information on the number of the cells.

According to the third aspect of the invention, there is provided a storage medium storing a computer-implemented program for reading information out of a two-dimensional code in any one of methods as described above.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3($b$) shows binary-coded scanning line signals derived by scan along the scanning lines shown in FIG. 3($a$);

FIG. 6($b$) shows a signal waveform outputted from a binary coding circuit;

FIGS. 11($b$-1), 11($b$-2), 11($b$-3), 11($b$-4), 11($b$-5), 11($b$-6), 11($b$-7), 11($b$-8), and 11($b$-9) show reference patterns used to locate the center of an alignment symbol;

FIG. 13($b$) is an enlarged view of FIG. 13($a$);

FIG. 14($a$) shows one example of a reference brightness check dot and eight surrounding brightness check dots defined in an image of an alignment symbol;

FIG. 14($b$) shows one of brightness check dots found to fall in a central cell of an image of an alignment symbol;

FIG. 14($c$) shows an outer periphery of an intermediate square frame of an alignment symbol used to determine a central position of the alignment symbol;

FIG. 16($b$) shows a conventional two-dimensional code;

FIG. 18($a$) shows an image of a two-dimensional code when captured from a diagonal direction; and FIG. 18($b$) shows an image of a two-dimensional code printed on a round object.

DESCRIPTION OF THE PREFERRED EMBODIMENTS

Figure 1:
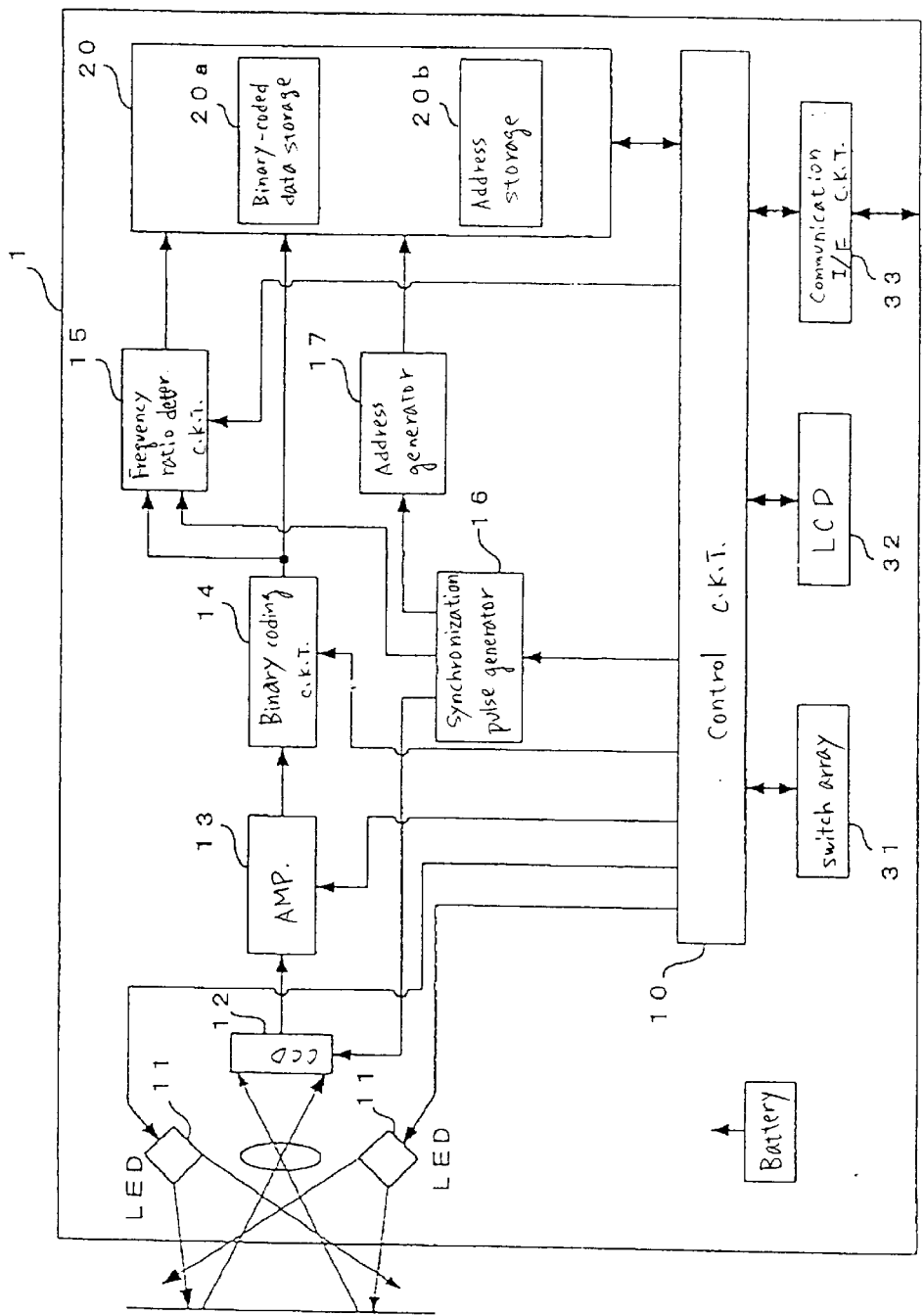
FIG. 1 is a block diagram which shows a two-dimensional reader according to the present invention.

Referring now to the drawings, wherein like numbers refer to like parts in several views, particularly to FIG. 1, there is shown a two-dimensional code reader 1 according to the invention which is designed to optically read information out of a two-dimensional code.

The two-dimensional code reader 1 generally includes a control circuit 10, light-emitting diodes (LEDs) 11, an area sensor 12, an amplifier 13, a binary coding circuit 14, a frequency ratio detecting circuit 15, a synchronization pulse generator 16, an address generator 17, an image memory 20, a switch array 31, a liquid-crystal display 32, and a communication I/F circuit 33.

The control circuit 10 is made of a microcomputer consisting of a CPU, a ROM, a RAM, an I/O, etc. The control circuit 10 executes a code reading program, as will be discussed later in detail, stored in the ROM and controls the circuit components of the two-dimensional code reader 1.

The LEDs 11 each emit a red beam to a two-dimensional code to read information carried thereby optically.

The area sensor 12 is made of a CCD camera which is made up of a matrix of light-sensitive elements and which captures an image of the two-dimensional code in a bit mapped pattern and outputs horizontal scanning line signals indicative of the captured image. The horizontal scanning line signals are inputted to the amplifier 13 and the binary-coding circuit 14.

The amplifier 13 amplifies the horizontal scanning line signals outputted from the area sensor 12 at an amplification factor set as a function of a gain control voltage inputted from the control circuit 10. The binary-coding circuit 14 codes each of the horizontal scanning line signals from the amplifier 13 into binary numbers or logical signals using a threshold value and outputs them to the frequency ratio detecting circuit 15 and the image memory 20.

The frequency ratio detecting circuit 15 detects a portion of the binary-coded horizontal scanning line signal which shows a given frequency component ratio and outputs a signal indicative thereof to the image memory 20. The outputs from the binary-coding circuit 14 are also stored in a binary-coded data storage region 20a of the image memory 20.

The area sensor 12 is designed to capture an image of the two-dimensional code cyclically. Each time the image of the two-dimensional code is captured, the image data stored in the binary-coded data storage region 20a is updated.

The synchronization pulse generator 16 outputs synchronization pulses much higher in frequency than two-dimensional image pulses outputted from the area sensor 12. The address generator 17 counts the synchronization pulses from the synchronization pulse generator 16 to produce corresponding addresses indicating memory locations of the binary-coded data storage region 20a of the image memory 20. The binary-coded data and multivalued data are stored in the binary-coded data storage region 20a in units of eight bits per address.

The frequency ratio detecting circuit 15 detects changes of a sequence of the binary signals outputted from the binary-coding circuit 14 from logic 0 to 1 and 1 to 0 and counts the number of synchronization pulses outputted from the synchronization pulse generator 16 for each interval between adjacent two of the changes of the binary signal to measure the length of a light portion (logic 1) and the length of a dark portion (logic 0) of the image of the two-dimensional code. The frequency ratio detecting circuit 15 calculates a ratio of the length of the light portion to the length of the dark portion of the image of the two-dimensional code (i.e., a frequency component ratio) to determine whether a given optical pattern of the two-dimensional code is being detected or not.

The switch array 31 is made up of a start switch for starting the two-dimensional code reader 1, ten key switches, and a variety of function key switches used in inputting information to the two-dimensional code reader 1. The liquid-crystal display 32 is, for example, a two-gradient liquid-crystal display which visually indicates optical information read out of the two-dimensional code, etc.

The communication I/F circuit 33 is used to transmit data to an external device (not shown) using, for example, a light-emitting element and receive data therefrom such as a system operating program and transmission standby commands.

Figure 2:
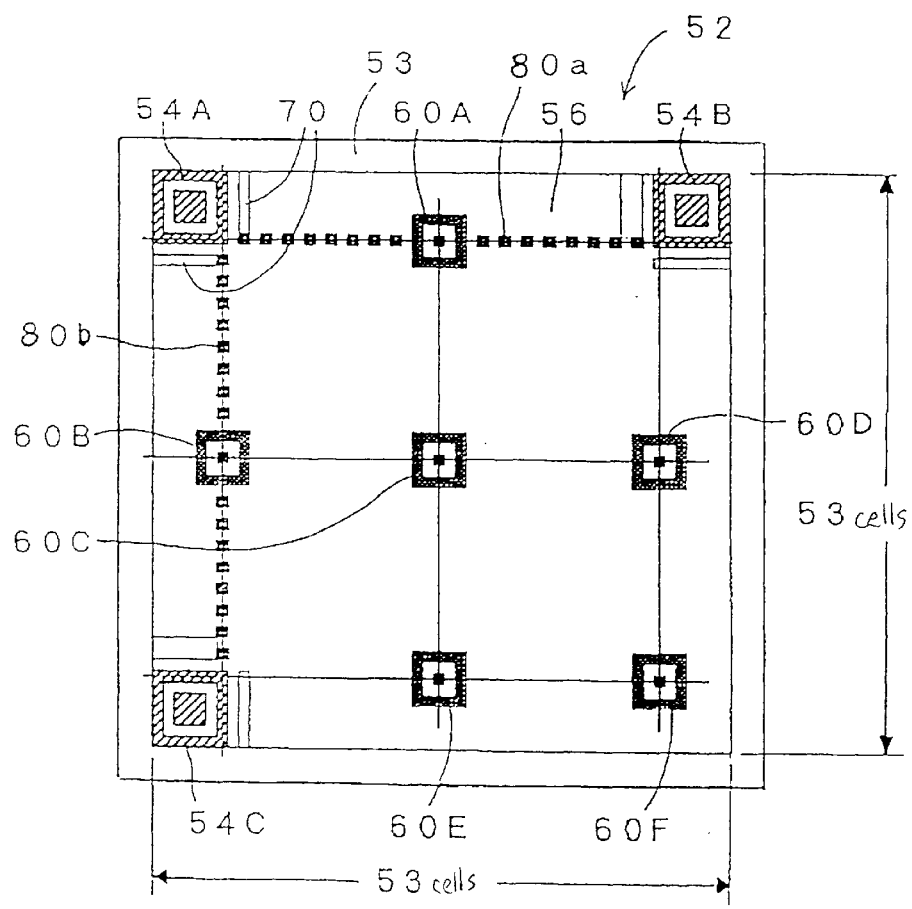
FIG. 2 shows an example of a two-dimensional code from which optical information is read out.

FIG. 2 shows an example of the two-dimensional code to be read out by the two-dimensional code reader 1.

The two-dimensional code 52 is printed on a white base 53 such as paper and includes three location symbols 54A, 54B, and 54C (also called position detection patterns), a data field 56, six alignment symbols 60A, 60B, 60C, 60D, 60E, and 60F, format codes 70, and arrays of timing cells 80a and 80b.

The two-dimensional code 52 is formed as a whole with a square matrix of 53×53 cells. Each cell is of one of two optically different types and, as one example in this embodiment, colored either white (light) or black (dark). FIG. 2 does not show a optical pattern of the data field 56 for the brevity of illustration.

Figures 3A, 3B:
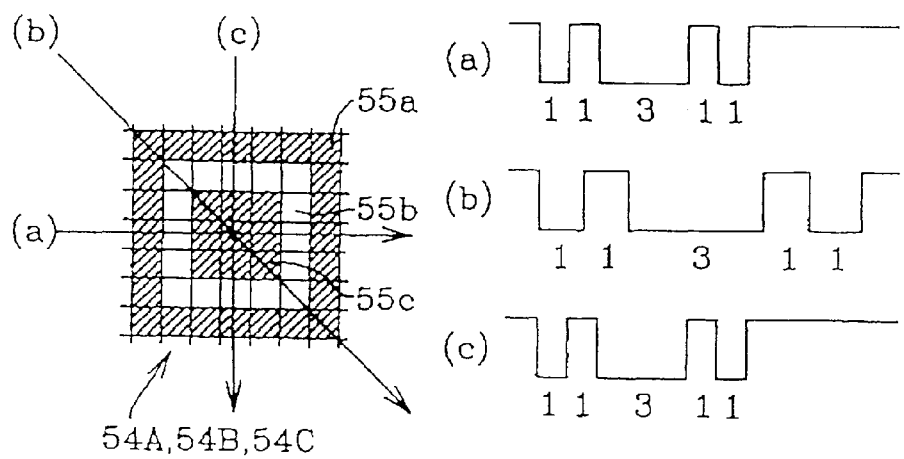
FIG. 3($a$) shows scanning lines passing through a location symbol.

The location symbols 54A, 54B, and 54C are, as can be seen in the drawing, arranged on three of four corners of the two-dimensional code 52. Each of the location symbols 54A to 54C has, as shown in FIG. 3(a), an optical pattern made of a black square frame 55a formed with four sides each consisting of an array of seven (7) cells, a white square frame 55b formed with four sides each consisting of an array of five (5) cells, and a central black square 55c consisting of 3×3 cells.

Figure 4:
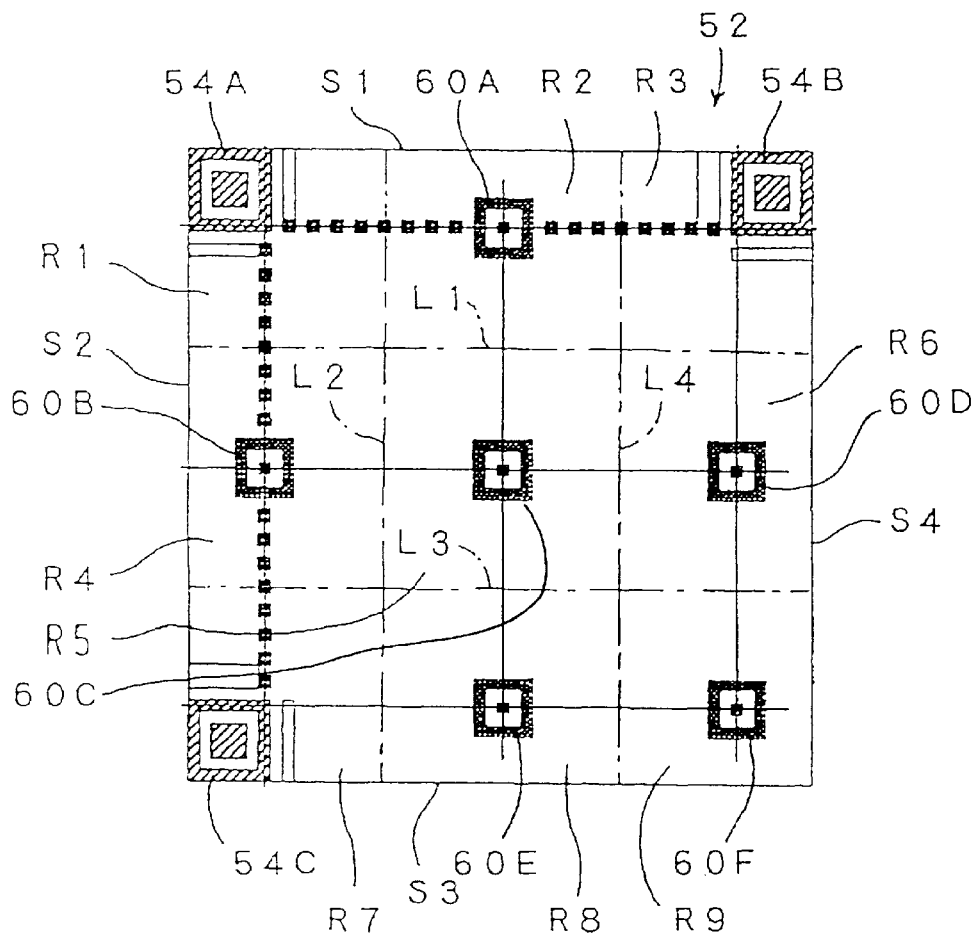
FIG. 4 shows arrangement of location symbols and alignment symbols in a two-dimensional code.

Each of the alignment symbols 60A to 60F is, as shown in FIG. 4, placed in one of six of nine square areas R1, R2, R3, R4, R5, R6, R7, R8, and R9 defined in the two-dimensional code 52 by four lines L1, L2, L3, and L4 each extending parallel to one of four sides S1, S2, S3, and S4 of the two-dimensional code 52. Specifically, each of the alignment symbols 60A to 60C is placed in one of the six rectangular areas R2, R4, R5, R6, R8, and R9 in which the location symbols 54A to 54C are not arranged.

Figure 5:
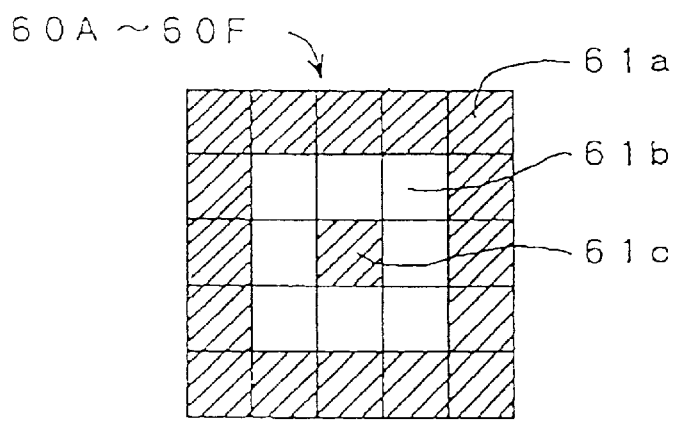
FIG. 5 shows an optical pattern of each alignment symbol printed on a two-dimensional code.

Each of the alignment symbols 60A to 60F has, as shown in FIG. 5, an optical pattern made of a black square frame 61a formed with four sides each consisting of an array of five (5) cells, a white square frame 61b formed with four sides each consisting of an array of three (3) cells, and a central black cell 61c.

The format codes 70 are, as shown in FIG. 2, printed near the location symbol 54A and each have a preselected optical pattern indicating information on arrangement (i.e., locations) of the alignment symbols 60A to 60F and information on the number of data cells.

The format codes 70 may carry the information on the location of each of the alignment symbols 60A to 60F and the number of data cell directly or indirectly. For instance, the format codes 70 may carry preselected data classification numbers each indicating one of data on the locations of the alignment symbols 60A to 60F and data on the number of data cells. In this case, the locations of the alignment symbols 60A to 60F and the number of data cells may be found by look-up using a table stored in the RAM of the control circuit 10 which represents the relation among the data classification numbers, the locations of the alignment symbols 60A to 60F, and the number of data cells.

The arrays of timing cells 80a and 80b extend between the location symbols 54A and 54B and between the location symbols 54A and 54C, respectively. Each of the arrays of timing cells 80a and 80b consists of white and black squares arranged in an alternate fashion and is used as a reference pattern for locating each data cell. U.S. Pat. No. 5,726,435 issued Mar. 10, 1998, assigned to the same assignee as that of this application teaches locating each data cell using timing cells, disclosure of which is incorporated herein by reference.

Figure 6A:
FIG. 6($a$) shows a signal waveform outputted from an area sensor.
Figure 6B:
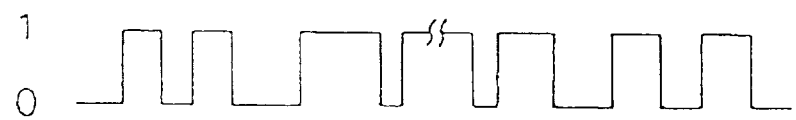

In operation of the two-dimensional code reader 1, the control circuit 10 outputs an image pickup command signal to the area sensor 12. The area sensor 12 captures an image around the two-dimensional code 52 and outputs a two-dimensional image data in the form of a multi-level signal, as shown in FIG. 6(a). The output of the amplifier 13 is inputted to the binary-coding circuit 14. The binary-coding circuit 14 codes the input into binary numbers or logical signals, as shown in FIG. 6(b), using a threshold value specified by the control circuit 10. The logical signals outputted from the binary-coding circuit 14 are stored in the binary-coded data storage region 20a of the image memory 20 as the two-dimensional image data. The scanning line signals outputted from the area sensor 12 are produced in units of an array of pixels, and the synchronization pulses are outputted from the synchronization pulse generator 16 at regular intervals equivalent to pixel-to-pixel signal output intervals, therefore, the light/dark pattern (i.e., the brightness) of the two-dimensional image data is represented in units of a pixel of the area sensor 12.

The frequency ratio detecting circuit 15, as described above, detects changes of a sequence of the binary signals outputted from the binary-coding circuit 14 from logic 0 to 1 and 1 to 0 and counts the number of synchronization pulses outputted from the synchronization pulse generator 16 for each interval between adjacent two of the changes of the binary signal and measures the length of a continuous light portion (logic 1) and the length of a continuous dark portion (logic 0) of the image of the two-dimensional code 52 to determine the ratio of the length of the light portion to the length of the dark portion of the image of the two-dimensional code 52 (i.e., the frequency component ratio) which indicates an optical pattern representing one of the location symbols 54A to 54C.

When each of the location symbols 54A to 54C is scanned along three lines (a), (b), and (c), as shown in FIG. 3(a), passing through the center thereof at typical angles, optical signal patterns, as shown in FIG. 3(b), are produced which assume the same brightness component ratio (i.e., the same frequency component ratio). Specifically, the frequency component ratio indicated by the optical signal pattern along each of the scanning lines (a), (b), and (c) is dark:light:dark:light:dark=1:1:3:1:1. Of course, a scanning line passing at an angle intermediate between the scanning lines (a) and (b) or between (b) and (c) also shows the same ratio of 1:1:3:1:1. Additionally, even if each of the location symbols 54A to 54c is arranged on a plane inclined at any angle to a sensor plane of the area sensor 12, the frequency component ratio indicated by each of the scanning lines (a) to (c) is 1:1:3:1:1.

The pulse signals (a), (b), and (c) shown in FIG. 3(b) represent signals which are picked up along the scanning lines (a), (b), and (c) in FIG. 3(a) and binary-coded by the binary-coding circuit 14.

At a time when detecting a frequency component ratio of 1:1:3:1:1 in the above manner, the frequency ratio detecting circuit 15 latches one of addresses generated by the address generator 17 and stores it to the address storage region 20b of the image memory 20. Therefore, when area sensor 12 has produced two-dimensional image data of one frame, the image data binary-coded by the binary-coding circuit 14 is stored in the binary-coded data storage region 20a of the image memory 20, and addresses of some of or all of the location symbols 54A to 54C which were successful in being captured by the area sensor 12 are stored in the address storage region 20b.

After a two-dimensional image of one frame is produced completely from the area sensor 12, the control circuit 10 begins performing a two-dimensional code reading operation, as will be discussed later, based on data stored in the image memory 20. Upon completion of this operation, the control circuit 10 issues a command for the area sensor 12 to capture a two-dimensional image of a subsequent frame and performs the two-dimensional code reading operation again.

Figure 7:
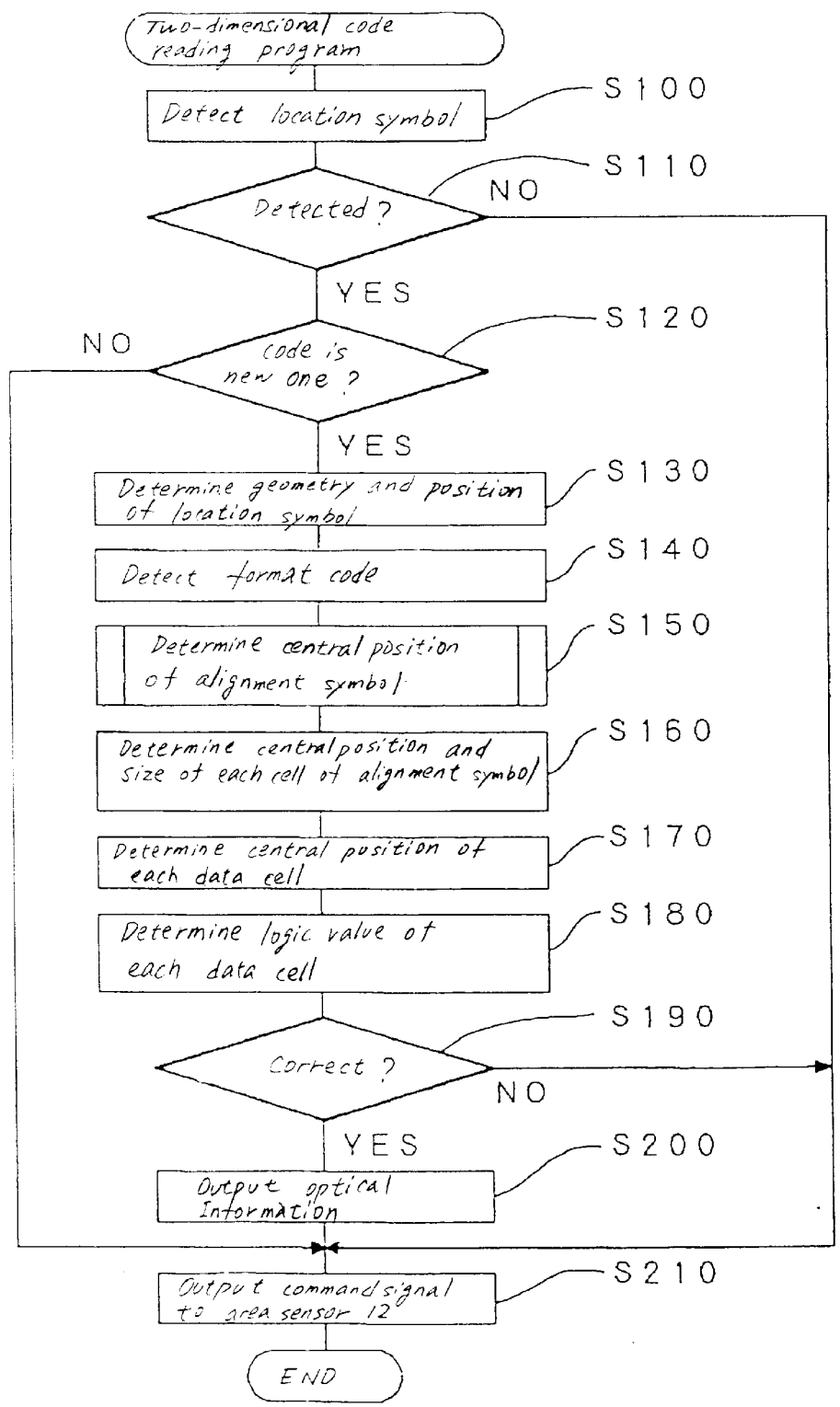
FIG. 7 is a flowchart of a main program for decoding a two-dimensional code.

FIG. 7 shows a two-dimensional code reading program performed by the control circuit 10 after an image of the two-dimensional code 52 of one frame and addresses of the location symbols 54A to 54C are stored in the image memory 20, respectively. This program may be preinstalled in the ROM of the control circuit 10 or installed as necessary by loading a mechanically readable storage medium such as a floppy disc, a magneto-optical disc, a CD-ROM, or a hard disc which stores therein the program. In the following discussion, it is assumed that a deformed image of the two-dimensional code 52 is captured by the area sensor 12.

After entering the program, the routine proceeds to step 100 wherein the control circuit 10 begins detecting the location symbols 54A to 54C. Specifically, the control circuit 10 gains access to the image memory 20 to determine whether the three location symbols 54A to 54C are all in place or not and to determine the geometry and central position of each of the location symbols 54A to 54C in a two-dimensional image captured by the area sensor 12 in the following manner.

First, it is determined whether it is possible to group addresses stored in the address storage region 20b of the image memory 20 under three locations at which the location symbols 54A to 54C are to lie in the two-dimensional image or not by looking up the binary-coded data storage region 20a and the address storage region 20b. The geometry and central location of each of the location symbols 54A to 54C is determined based on a binary pattern (i.e., a white/black pattern) of the image stored in the binary-coded data storage region 20a to determine whether the location symbols 54A to 54C lie at three of four corners of the two-dimensional code 52, as shown in FIG. 2, or not.

The routine proceeds to step 110 wherein it is determined whether the three location symbols 54A to 54C have been detected correctly or not based on results of determination in step 100. If a NO answer is obtained, then the routine proceeds directly to step 210 to issue a command for the area sensor 12 to capture an image of a subsequent frame.

If a YES answer is obtained in step 110, then the routine proceeds to step 120 wherein it is determined whether the two-dimensional code 52 detected in this program execution cycle is a new one or not. This determination is made for preventing the two-dimensional code 52 which continues to be analyzed from a previous program execution cycle from being determined in error as another one captured for the first time in this program execution cycle by the area sensor 12. For example, when the three location symbols 54A to 54C have already been detected correctly, and the contents of the two-dimensional code 52 have also been read correctly one or several program execution cycles earlier, it is determined that the two-dimensional code 52 being analyzed in this program execution cycle is the same as that analyzed in the previous program execution cycle. In this case, a NO answer is obtained in step 120, and the routine proceeds to step 210.

If a YES answer is obtained in step 120, then the routine proceeds to step 130 wherein the size and central position of each cell of the location symbols 54A to 54C are determined using the geometry of the location symbols 54A to 54C in the following manner.

Figure 8:
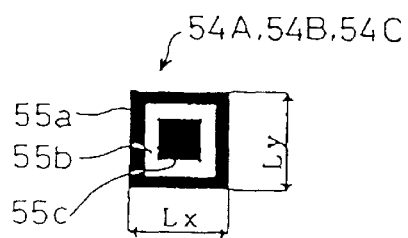
FIG. 8 shows an optical pattern of each location symbol.

The outer black square frame 55a of each of the location symbols 54A to 54C, as clearly shown in FIG. 8, has the width equivalent to one cell. Similarly, the inner white frame 55b has the width equivalent to one cell. The central black square 55c has the width equivalent to three cells. The size, i.e., the length Wy and width Wx of each cell of the location symbols 54A to 54C are, therefore, determined by dividing, as shown below, the overall length Ly and width Lx of an image of one of the location symbols 54A to 54C stored in the image memory 20 by seven (7).

$Wy=Ly/7$ $Wx=Lx/7$

Next, the central position of each cell in the location symbols 54A to 54C is determined using the length Wy and width Wx calculated in the above manner.

The routine proceeds to step 140 wherein the format codes 70 are detected based on the position of the location symbol 54A. The format codes 70 are, as shown in FIG. 2, arranged in parallel to and at an interval equivalent to one cell away from two of four sides of the outer black square frame 55a of the location symbol 54A opposed to the location symbols 54B and 54C, respectively. Using this positional relation, the format codes 70 are detected. By analyzing the format codes 70, the arrangement of the alignment symbols 60A to 60F in the two-dimensional code 52 and the number of data cells (i.e., 53×53 data cells in the case shown in FIG. 2) are determined.

The routine proceeds to step 150 wherein central positions of the alignment pattern 60A to 60C in the image of the two-dimensional code 52 are determined mathematically in a manner, as will be described later in FIG. 9.

The routine proceeds to step 160 wherein the size and central position of each cell of the alignment symbols 60A to 60F are determined in the same manner as described in step 130.

The routine proceeds to step 170 wherein the central positions of the data cells in the data field 56 are determined in units of the rectangular areas R1 to R9. Specifically, the rectangular area R1 are divided into units of cells based on the central positions, the size, and the orientation of the data cells making up the location symbol 54A to determine x and y coordinates of the centers of all the data cells in the rectangular area R1. Similarly, x and y coordinates of the centers of the data cells in the rectangular areas R3 and R7 are determined based on the location symbols 54B and 54C, respectively.

The x and y coordinates of the centers of the data cells in each of the remaining rectangular areas R2, R4, R5, R6, R8, and R9 are determined using the central positions, the size, and the orientation of the data cells making up a corresponding one of the alignment symbols 60A to 60F in a manner similar to that used in determining the centers of the data cells of the rectangular areas R1, R3, and R7.

The routine proceeds to step 180 wherein the binary number is read out of a pixel lying at the center of each of all the data cells to determine the binary number (i.e., a logic 0 or 1) of each data cell, that is, to determine whether each data cell is light or dark, thereby obtaining optical information carried by the two-dimensional code 52.

The routine proceeds to step 190 wherein it is determined whether the contents of the two-dimensional code 52, that is, the optical information obtained in step 180 is correct or not. For instance, this determination is made by determining whether the numbers of detected black and white cells agree with predetermined numbers, respectively, or not or whether the result of an operation on the optical information according to a given algorithm matches up with a check code provided in a preselected location of the two-dimensional code 52 or not.

If a NO answer is obtained in step 190, then the routine proceeds to step 210 to issue a command for the area sensor 12 to capture an image of a subsequent frame. Alternatively, if a YES answer is obtained, then the routine proceeds to step 200 wherein the optical information obtained in step 180 is outputted to, for example, a host computer and/or stored in a memory or wherein an instruction represented by the optical information is executed.

The routine proceeds to step 210 to issue a command for the area sensor 12 to capture an image of a subsequent frame.

Figure 9:
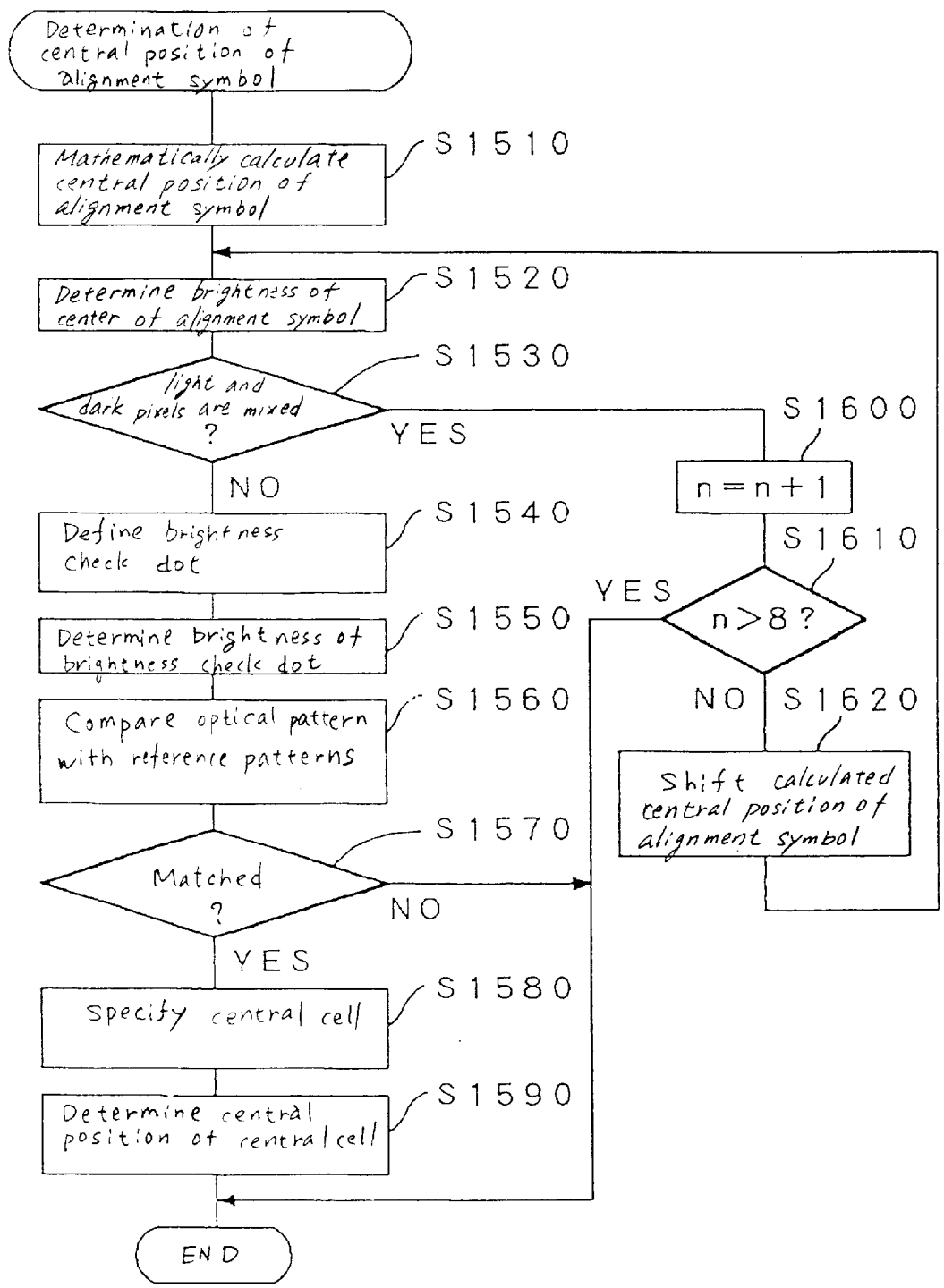
FIG. 9 is a flowchart of a subprogram for determining actual central positions of alignment symbols in an image of a two-dimensional code.

FIG. 9 shows a subprogram executed in step 150 in FIG. 7 to determine an actual central position of each of the alignment symbols 60A to 60F in the deformed image of the two-dimensional code 52 captured by the area sensor 12.

After entering step 150 in FIG. 7, the routine proceeds to step 1510 wherein the central position of each of the alignment symbols 60A to 60F in the two-dimensional image stored in the image memory 20a is mathematically determined in the following manner.

Figure 10:
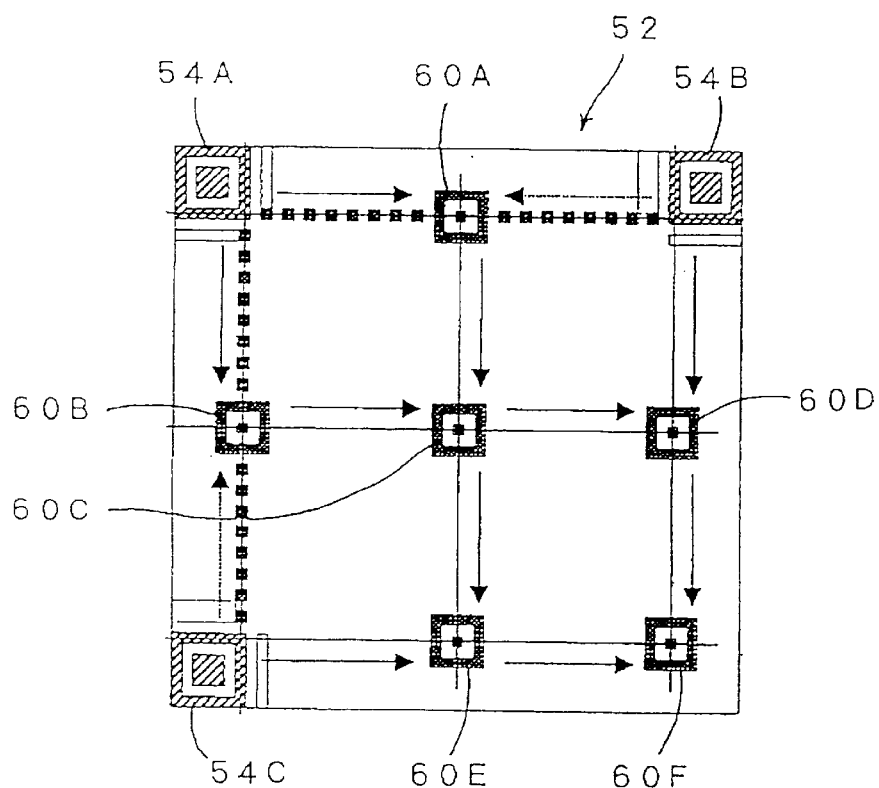
FIG. 10 is an illustration for explaining a method of calculating central positions of alignment symbols geometrically.

Data on the arrangement of the alignment symbols 60A to 60F in the two-dimensional code 52 and the number of data cells (i.e., 53×53 data cells in the case shown in FIG. 2) is, as described above, stored in the format codes 70 derived in step 140 in FIG. 7. Using this data, the central position of each of the alignment symbols 60A to 60F is determined. In practice, this subprogram is repeated six times to determine the central positions of all the alignment symbols 60A, 60B, 60C, 60D, 60E, and 60F in the order as indicated by arrows in FIG. 10. Specifically, the central position of the alignment symbol 60A arranged between the location symbols 54A and 54B is first determined based on a positional relation obtained from the format codes 70 in which the alignment symbol 60A is printed on the center of an interval between, for example, lower sides of the location symbols 54A and 54B (i.e., a lower side of the outer black square frame 55a shown in FIG. 3). Similarly, in subsequent program cycles, the central position of the alignment symbol 60B is determined using a positional relation to the location symbols 54A and 54C. The reason why the central positions of the alignment symbols 60A and 60B are determined early is that the positions of the location symbols 54A to 54C have already been determined accurately in step 130, so that the possibility that the central positions of the alignment symbols 60A and 60B are estimated correctly based on the positions of the location symbols 54A to 54C is high.

Next, the first line is defined which extends from the center of the alignment symbol 60A in parallel to a line passing through reference positions of the location symbols 54A and 54C. Each reference position is defined, for example, on the outer square frame 55a of one of the location symbols 54A and 54C. Similarly, the second line is defined which extends from the center of the alignment symbol 60B in parallel to a line passing through reference positions of the location symbols 54A and 54B. The position of an intersection of the first and second lines is determined mathematically and defined as the central position of the alignment symbol 60C lying at the center of the image of the two-dimensional code 52.

Similarly, the third line is defined which extends from the center of the alignment symbol 60C in parallel to the line passing through the reference positions of the location symbols 54A and 54B. The fourth line is defined which extends from the reference position of the location symbol 54B in parallel to the line passing through the reference positions of the location symbols 54A and 54C. The position of an intersection of the third and fourth lines is determined mathematically and defined as the central position of the alignment symbol 60D lying at a right central portion of the image of the two-dimensional code 52.

Subsequently, the fifth line is defined which extends from the center of the alignment symbol 60C in parallel to the line passing through the reference positions of the location symbols 54A and 54C. The sixth line is defined which extends from the reference position of the location symbol 54C in parallel to the line passing through the reference positions of the location symbols 54A and 54B or the second line. The position of an intersection of the fifth and sixth lines is determined mathematically and defined as the central position of the alignment symbol 60E lying at a lower central portion of the image of the two-dimensional code 52.

Finally, the seventh line is defined which extends from the center of the alignment symbol 60D in parallel to the line passing through the reference positions of the location symbols 54A and 54C or the fifth line. The eighth line is defined which extends from the central position of the alignment symbol 60E in parallel to the line passing through the reference positions of the location symbols 54A and 54B or the third line. The position of an intersection of the seventh and eighth lines is determined mathematically and defined as the central position of the alignment symbol 60F lying at a right lower portion of the image of the two-dimensional code 52.

The order in which the central positions of the alignment symbols 60A to 60F are determined is not limited to the above. For example, either of the lines extending from the location symbols 54B and 54C, as indicated by broken lines in FIG. 10 may be first used to determine one of the central positions of the alignment symbols 60A and 60B.

The central position of each of the alignment symbols 60A to 60F is, as apparent from the above discussion, calculated merely based on the positions of the location symbols 54A to 54C. Thus, if the base 52 on which the two-dimensional code 52 is printed is attached to, for example, a round object, so that the image of the two-dimensional code 52 captured by the area sensor 12 is deformed, it will produce an error between the central position of each of the alignment symbols 60A to 60F calculated in the above manner and an actual central position thereof in the image of the two-dimensional code 52. This positional error is compensated for through the following steps.

After the central positions of the alignment symbols 60A to 60F are calculated in step 1510, subsequent steps 1520 to 1620 are executed. Operations in steps 1520 to 1620 to correct the central positions of the alignment symbols 60A to 60F calculated in step 1510 are performed on the condition that the positional error between each of the calculated central positions of the alignment symbols 60A to 60C and the actual central positions thereof in the image of the two-dimensional code 52 lies at least within an actual central area of a corresponding one of the alignment symbols 60A to 60C defined by, as shown in FIG. 11(*a*), the central square 61*c* (i.e., the cell e) and a surrounding square frame 61*b* made up of eight cells a, b, c, d, f, g, h, and i. In practice, the positional errors of the calculated central positions of the alignment symbols 60A to 60C are found to almost fall within the above area. The correction of each of the calculated central positions of the alignment symbols 60A to 60F is, as described later in detail, achieved by selecting one of reference patterns, as shown in FIGS. 11(*b*-1) to 11(*b*-9) which matches up with an optical pattern formed with a reference brightness check dot defined at the center of one of the alignment symbols 60A to 60F calculated in step 1510 and eight brightness check dots defined at locations surrounding the reference brightness check dot at intervals of one cell away from the reference brightness check dot and specifying one of cells of the matched reference pattern corresponding to the central cell of the one of the alignment symbols 60A to 60F.

Steps 1520 to 1620 will be described below in detail.

Figure 13A:
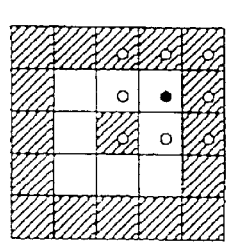
FIG. 13($a$) shows one example of a reference brightness check dot and eight surrounding brightness check dots defined in an image of an alignment symbol.
Figure 13B:
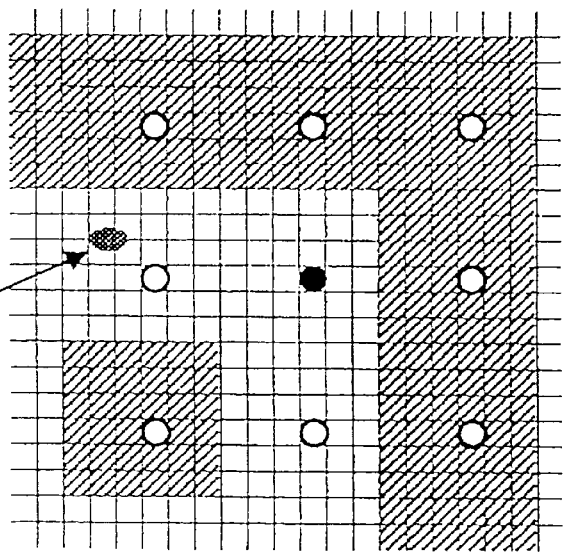

In step 1520, the brightness of the center of the first one of the alignment symbols 60A to 60F calculated in step 1510 is determined. In this embodiment, each cell in the two-dimensional image captured by the area sensor 12 is made up of a matrix of 6×6 pixels, as shown in FIG. 13(*b*), and the determination of brightness of a portion of the two-dimensional image is made in units of a pixel. Therefore, if a dark stain is over the center of one of the alignment symbols 60A to 60F, the brightness of the center thereof may fail to be determined. In order to avoid this problem, this embodiment makes a determination of the brightness of the center of each of the alignment symbols 60A to 60F based on not only the central pixel of an image of a corresponding one of the alignment symbols 60A to 60F, but also a plurality of pixels surrounding the central pixel. For instance, the brightness levels of four surrounding pixels, as represented in "□" in FIG. 12(*a*), are also checked in addition to that of a pixel, as represented in "●", lying at the calculated center of one of the alignment symbols 60A to 60F. Alternatively, the brightness levels of eight surrounding pixels, as represented in "□" in FIG. 12(*b*), lying at intervals of one pixel away from the central pixel, as represented in "●", may also be checked. If the number of light pixels of an image of one of the alignment symbols 60A to 60B is greater than that of dark pixels, it may be determined that the center of the one of the alignment symbols 60A to 60F is light (i.e., white). This enables accurate determination of the brightness of the center of the alignment symbols 60A to 60B even if a little dark stain "●", as shown in FIG. 12(*a*) or 12(*b*), is on the center of one of the alignment symbols 60A to 60B.

The determination of the brightness of the calculated center of each of the alignment symbols 60A to 60F in the manner as shown in FIG. 12(*a*) may, however, have the problem in that if a pixel, as represented in "○" in FIG. 12(*c*), at the calculated center of one of the alignment symbols 60A to 60F lies next to a collection of pixels, as represented in hatched lines, whose brightness is different from that of the central pixel, the determination of whether the number of light pixels is greater than that of dark pixels or not or vice versa depends only upon the brightness of the central pixel "○". It is, therefore, advisable that the brightness levels of surrounding pixels, as shown in FIGS. 12(*d*) and 12(*e*), lying at intervals of at least one pixel away from the central pixel "○" may also be checked. In the case shown in FIG. 12(*e*), the brightness levels of 12 surrounding pixels are also checked. The number of light surrounding pixels, as represented in "□" is seven (7). Thus, if the central pixel "○" is light, the number of light pixels will be eight (8) as a whole. Alternatively, if the central pixel "○" is dark, the number of light pixels will be seven (7) as a whole. In either case, it may be determined correctly that the pixel of each of the alignment symbols 60A to 60F lying at the central position calculated in step 1510 is light.

The above manner may also be used in step 180 of FIG. 7 to determine whether each data cell of the two-dimensional code 52 is light or dark for obtaining the optical information carried by the two-dimensional code 52.

Returning back to FIG. 9, after step 1520, the routine proceeds to step 1530 wherein it is determined whether light and dark pixels are mixed or not in a given area (e.g., 5×5 pixels, as shown in FIGS. 12(*b*), 12(*d*), and 12(*e*)) of an image of one of the alignment symbols 60A to 60F around the central position calculated in step 1510. Specifically, if a mix of light and dark pixels has been found in step 1520 around the calculated center of one of the alignment symbols 60A to 60F in determining the brightness of the center of the one of the alignment symbols 60A to 60F based on the number of light and dark pixels, a YES answer is obtained, and the routine proceeds to step 1600. Alternatively, if the mix of light and dark pixels has not been found in step 1520, a NO answer is obtained, and the routine proceeds to step 1540.

The determination in step 1520 is, as can be seen from the above, used in step 1530 only for determining whether light and dark pixels are mixed around the calculated center of one of the alignment symbols 60A to 60F. Therefore, step 1520 is not always required to determine the brightness of the calculated center of each of the alignment symbols 60A to 60F accurately, but may produce data only required in step 1530.

The subprogram in FIG. 9 is, as described above, executed for each of the alignment symbols 60A to 60B. The following discussion will refer only to the alignment symbol 60A for the simplicity of disclosure.

If a NO answer is obtained in step 1530, then the routine proceeds to step 1540 wherein a pixel of an image of the alignment symbol 60A lying at the central position thereof calculated in step 1510 is defined as the reference brightness check dot, as described above, and eight pixels which are located at intervals equivalent to one cell (i.e., 6 pixels in this embodiment) away from the reference brightness check dot are selected as the brightness check dots. For instance, if the calculated central pixel is represented in black circle in FIGS. 13(a) and 13(b), eight pixels, as represented in white circles, located six pixels away from the calculated central pixel are selected as the brightness check dots. The brightness check dots coincide with the centers of eight cells surrounding the reference brightness check dot, respectively.

The routine proceeds to step 1550 wherein the brightness of each of the brightness check dots selected in step 1540 is determined in the same manner as described above wherein the brightness of one pixel is determined based on the number of light or dark pixels within an area extending over a given number of pixels surrounding the one pixel.

The routine proceeds to step 1560 wherein an optical pattern formed with a total of nine pixels: the reference brightness check dot plus the eight brightness check dots is compared with nine reference patterns, as shown in FIG. 11(b1) to 11(b-9).

The routine proceeds to step 1570 wherein it is determined whether the optical pattern matches up with any of the reference patterns or not. If the optical pattern is the one shown in FIG. 13(a), it matches up with the reference pattern shown in FIG. 11(b-3).

Figure 11A:
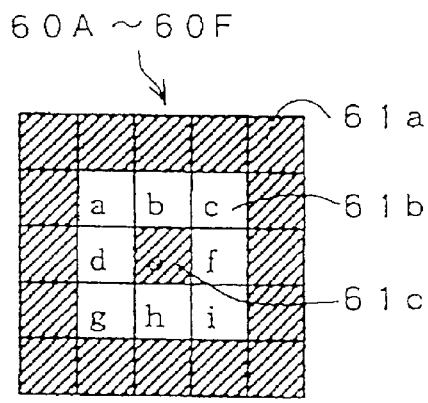
FIG. 11($a$) shows a dot pattern of an alignment symbol in an image of a two-dimensional code.
Figure 12A:
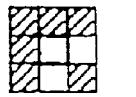
FIGS. 12($a$), 12($b$), 12($c$), 12($d$), and 12($e$) show pixels used to determine brightness of a calculated central position of an alignment symbol.
Figure 12A:
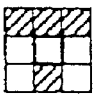
Figure 12A:
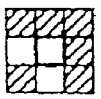
Figure 12A:
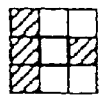
Figure 12A:
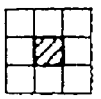
Figure 12A:
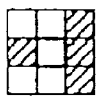
Figure 12A:
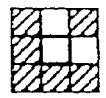
Figure 12A:
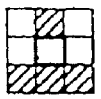
Figure 12A:
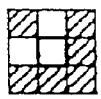
Figure 12A:
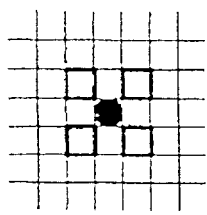
Figure 12B:
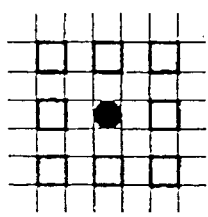
Figure 12C:
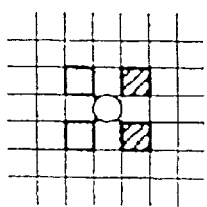
Figure 12D:
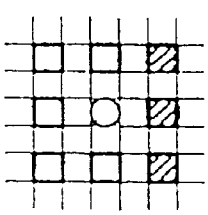
Figure 12E:
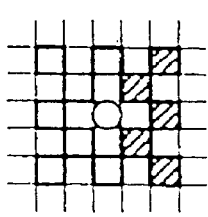

If a YES answer is obtained in step 1570, then the routine proceeds to step 1580 wherein which cell of the matched reference pattern corresponds to the actual central cell e of the image of the alignment symbol 60A, as shown in FIG. 11(a), is found to determine which of the eight brightness check pixels forming the optical pattern defined in step 1560 lies within the actual central cell e, thereby finding which cell of the image of the alignment symbol 60A is the actual central cell e.

Each reference pattern is, as clearly shown in FIGS. 11(b-1) to 11(b-9), formed with one of all possible combinations of 3×3 cells containing the central cell e of the image of each of the alignment symbols 60A to 60F. For instance, the reference pattern in FIG. 11(b-1) is formed with 3×3 cells lying at upper left portion of the alignment symbol shown in FIG. 11(a). Thus, if there is a matched reference pattern, it is found that the optical pattern defined in step 1560 corresponds to which part of the alignment symbol 60A, that is, that which cell of the matched reference pattern corresponds to the central cell e of the alignment symbol 60A. For instance, the reference pattern in FIG. 11(b-1) is selected as matching the optical pattern defined in this program cycle, it is determined that a cell lying at a lower right corner of the reference pattern corresponds to the central cell e of the alignment symbol 60A, that is, that a lower right one of the brightness check dots lies within the central cell e of the alignment symbol 60A, thereby finding which cell of the image of the alignment symbol 60A is the actual central cell e of the alignment symbol 60A.

Subsequently, the routine proceeds to step 1590 wherein the central position of one of cells of the image of the alignment symbol 60A found in step 1580 to be the actual central cell e of the alignment symbol 60A is determined by measuring a horizontal width a and a vertical width b, as shown in FIG. 14(b), of the cell found to be the actual central cell e of the alignment symbol 60A to determine central positions of the horizontal width a and the vertical width b as x and y coordinates of the central position of the cell found to be the central cell e of the alignment symbol 60A or measuring a horizontal width A and a vertical width B of the white square frame 61b of the alignment symbol 60A formed with eight white cells surrounding the central cell 61c in the image of the alignment symbol 60A to determine central positions of the horizontal width A and the vertical width B as the x and y coordinates of the central position of the cell found to be the central cell e of the alignment symbol 60A.

For use of the horizontal and vertical widths A and B of the square frame 61b, if it is found in step 1580 that one of the eight brightness check dots, as indicated by P in FIG. 14(a), lies within the actual central cell e of the alignment symbol 60A, the number of pixels is counted from the brightness check dot P to each of four sides of the square frame 61b where changes in brightness from light to dark pixels are taken place to determine, as shown in FIG. 14(c), a distance A1 from the brightness check dot P to the left side of the square frame 61b, a distance A2 from the brightness check dot P to the right side of the square frame 61b, a distance B1 from the brightness check dot P to the upper side of the square frame 61b, and a distance B2 from the brightness check dot P to the lower side of the square frame 61b, thereby determining the horizontal and vertical widths A and B of the square frame 61b of the alignment symbol 60A in the deformed image of the two-dimensional code 52 and positions of the four sides of the square frame 61b. Note that A1+A2=A, and B1+B2=B. Next, the horizontal and vertical widths A and B are each divided by two (2) to determine distances from adjacent two of the sides of the square frame 61b (e.g., the upper and right sides of the square frame 61b) to the center of the square frame 61b (i.e., the center of the alignment symbol 60A in the image of the two-dimensional code 52). Finally, the position of the center of the square frame 61b is calculated based on the determined distances and the positions of the four sides of the square frame 61b.

Returning back to FIG. 9, if a YES answer is obtained in step 1530 meaning that dark and light pixels are mixed around the central position calculated in step 1510, then the routine proceeds to step 1600 wherein a parameter n is incremented by one (1). The parameter n is initialized to zero (0) upon start of the main program in FIG. 7.

The routine proceeds to step 1610 wherein it is determined whether the parameter n is greater than eight (8) or not. If a NO answer is obtained (n≦8), then the routine proceeds to step 1620 wherein the central position of the image of the alignment symbol 60A calculated in step 1510 is shifted by half a cell (i.e., ½ cell) in a given direction. The routine then returns back to step 1530 through step 1520 to determine whether light and dark pixels are mixed or not around the shifted central position of the alignment symbol 60A. These operations are repeated until there is no mix of light and dark pixels around the shifted central position of the alignment symbol 60A. A maximum number of shifts of the calculated central position of the alignment symbol 60A is eight (8). This is because an optical pattern formed with a pixel lying at the shifted central position and surrounding pixels usually match with any of the reference patterns as shown in FIGS. 11(b-1) to 11(b-9) before the number of shifts of the calculated central position reaches eight (8).

The direction in which the calculated central position of the alignment symbol 60A is shifted may be any one of (1) a direction toward a place where the number of light pixels around the calculated central position is greater than that of dark pixels or vice versa and (2) a direction toward a collection of light pixels in the given area around the calculated central position which forms part of the white square frame 61b of the alignment symbol 60A because each of the reference patterns in FIGS. 11(b-1) to 11(b-9) contains some of cells of the square frame 61b, and the possibility that an optical pattern formed with a pixel lying at the shifted central position and surrounding pixels matches with any of the reference patterns becomes high. For example, if the central position of the alignment symbol 60A calculated in step 1510 lies, as indicated by α in FIG. 15, adjacent the boundary of an array of light pixels and an array of dark pixels, then step 1530 determines that there is a mix of light and dark pixels around the central position α. In this case, shifting the central position α in either of the above directions (1) and (2) will cause the central position α to be moved toward a collection of light pixels and reach a pixel, as indicated by β. Therefore, there will be no mix of light and dark pixels within an optical pattern formed with a matrix of, for example, 5×5 pixels around the pixel β, thereby resulting in a NO answer in step 1530.

Figure 15:
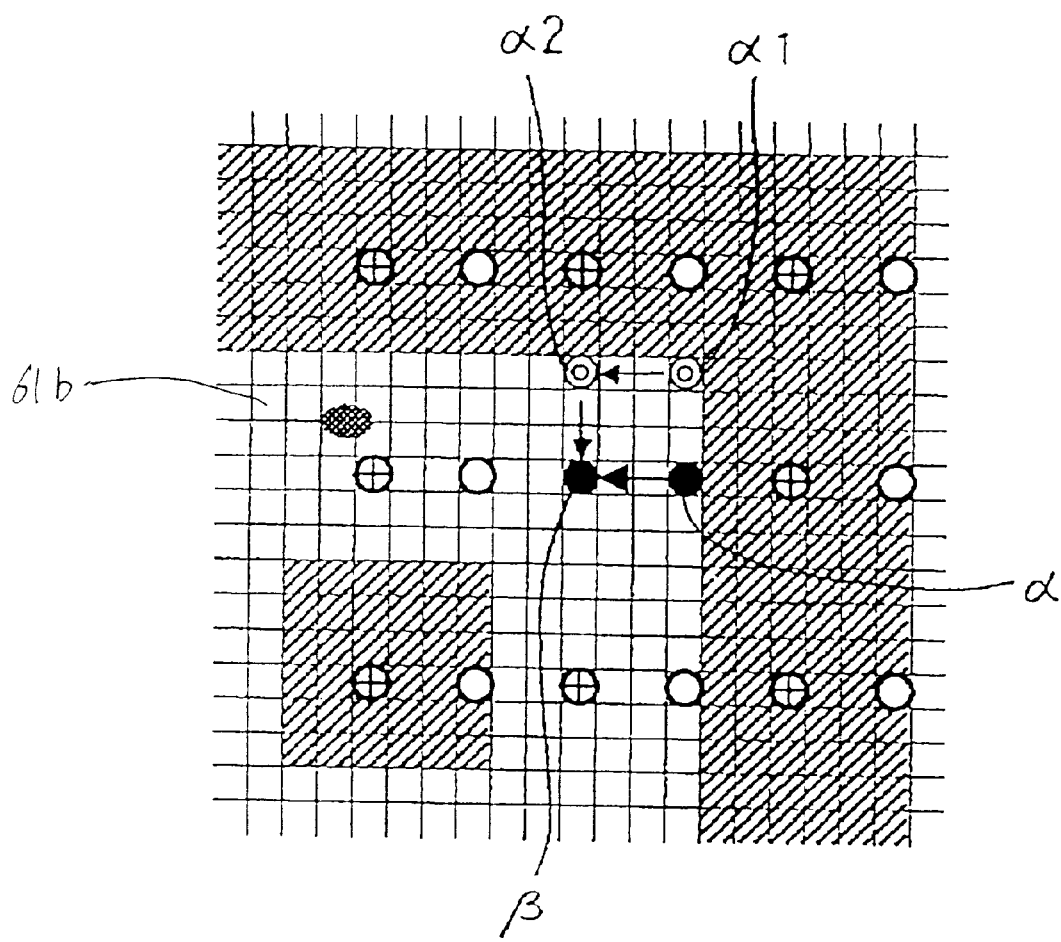
FIG. 15 is a partially enlarged view of an image of an alignment symbol for explaining a shift of a calculated center of the alignment symbol to a place where there is no mix of light and dark pixels.
Figure 16A:
FIG. 16($a$) shows a conventional bar code.
Figure 16B:
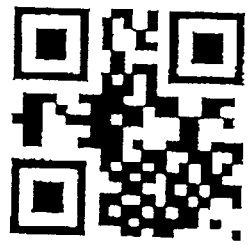
Figure 17:
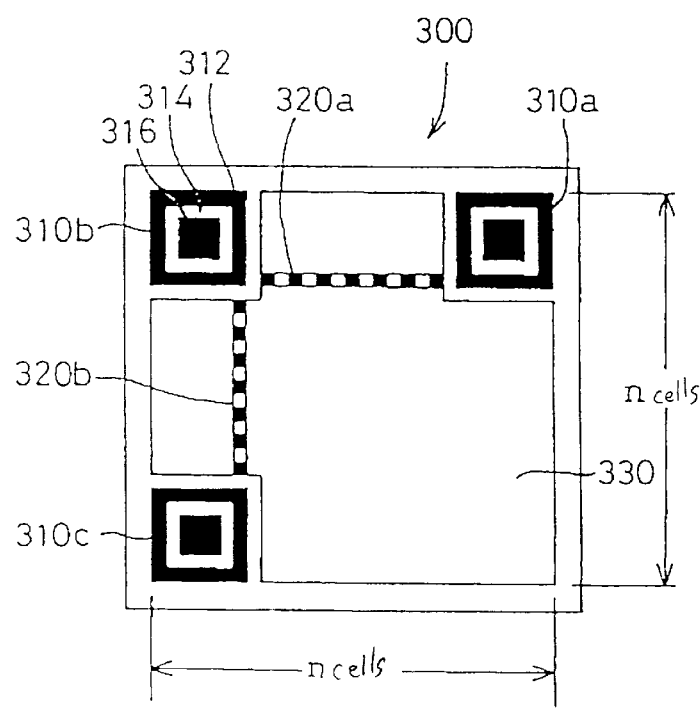
FIG. 17 is an enlarged view which shows a conventional two-dimensional code.

Alternatively, if the central position of the alignment symbol 60A calculated in step 1510 lies, as indicated by α1 in FIG. 15, at an upper right corner of the square frame 61b and is shifted by half a cell (i.e., three pixels) to a pixel, as indicated by α2, in the left direction like the above, the central position α2 still exists in a mix of light and dark pixels. In this case, the central position α2 of the alignment symbol 60A is, therefore, further shifted in either of the directions (1) and (2), so that it reaches the pixel β1. The central position α1 may also be first shifted to the pixel α and then to the pixel β.

The amount of shift of the calculated central position of each of the alignment symbols 60A to 60F is not limited to one-half of a cell and may be a fraction of a cell such as one-third or one-fourth of a cell. The amount of shift by one-half of a cell is, however, preferable. This is because the determination in step 1530 that light and dark pixels exist around the calculated central position of one of the alignment symbols 60A to 60F means that the brightness check pixels exist near a boundary of an array of light pixels and an array of dark pixels, and shifting the calculated central position by one-half a cell (i.e., three pixels in this embodiment) increases the possibility that the shifted central position will exist around an actual center.

The amount of shift of the calculated position of each of the alignment symbols 60A to 60F may also be determined regardless of the size of a cell.

Each of the alignment symbols 60A to 60F is not limited to a bit mapped pattern as shown in FIG. 5. For example, the square frames 61a and 61b and the central square 61c each may have the width greater than or equal to two cells. Each of the alignment symbols 60A to 60F may be of any shape other than square as a whole.

Each cell of the two-dimensional code 52 may alternatively be reversed in brightness.

While in the above embodiments, each of the location symbols 54A to 54C is formed with double black squares to show an optical pattern, whose frequency component ratio of dark:light:dark:light:dark=1:1:3:1:1, captured along a scanning line passing through the center thereof, it may have a geometrical pattern defined by similar figures arranged coaxially such as circles or hexagons. Additionally, a geometrical pattern defined by more than two similar figures arranged coaxially may be used if it exhibits the same frequency component ratio in every direction.

Further, an external form of the two-dimensional code 52 may be rectangular. Each of the location symbols 54A to 54C is arranged at one of corners of the two-dimensional code 52, however, it may be provided at any location. Four or more location symbols may also be arranged in any locations in the two-dimensional code 52. Alternatively, two location symbols may be printed on the two-dimensional code 52. In this case, the data field 56 may be located by arranging the location symbols either at two opposed corners or at two adjacent corners of the two-dimensional code 52 and detecting positions of the alignment symbols 60A to 60F. Further, a single location symbol may be printed at any location in the two-dimensional code 52. In this case, the location of each data cell may be specified by using a positional relation between the location symbol and the alignment symbols 60A to 60F.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A method of reading information out of a two-dimensional code made up of a matrix of cells having a given optical pattern, the two-dimensional code having at least one location symbol used to locate the two-dimensional code and at least one alignment symbol used to locate the cells, comprising the steps of:

capturing an image around the two-dimensional code in a bit mapped pattern;

detecting a position of the location symbol to determine a position of the two-dimensional code in the captured image;

calculating a central position of the alignment symbol in the captured image mathematically using a predetermined positional relation of the alignment symbol to the location symbol;

selecting a dot in the captured image lying at the calculated central position of the alignment symbol as a reference brightness check dot and dots lying in some of the cells around one of the cells of the captured image in which the reference brightness check dot exists as surrounding brightness check dots to define an alignment symbol optical pattern with a combination of the reference brightness check dot and the surrounding brightness check dots;

comparing the alignment symbol optical pattern with a plurality of reference optical patterns each formed with one of possible combinations of one of the cells lying at an actual central position of the alignment symbol and as many cells arranged adjacent the one of the cells as the surrounding brightness check dots to select one of the reference optical patterns matching up with the alignment symbol optical pattern;

correcting the calculated central position of the alignment symbol based on a position of one of the surrounding brightness check dots in the captured image corresponding to the one of the cells of the selected matching up reference optical pattern at the actual central position of the alignment symbol and a geometry of the alignment symbol to determine an actual central position of the alignment symbol in the captured image;

determining positions of the cells of the two-dimensional code in the captured image based on at least one of the position of the location symbol and the actual central position of the alignment symbol in the captured image; and reading the cells of the two-dimensional code in the captured image optically to decode the information carried by the two-dimensional code.

2. A method as set forth in claim 1, wherein the alignment symbol has one of: a pattern formed with a central dark cell, an intermediate square frame which surrounds the central dark cell, consists of an array of light pixels, and has a width equivalent to one cell, and an outer square frame which surrounds the intermediate square frame, consists of an array of dark cells, and has a width equivalent to one cell; and a pattern formed with a central light cell, an intermediate square frame which surrounds the central dark cell, consists of an array of dark pixels and has a width equivalent to one cell, and an outer square frame which surrounds the intermediate square frame, consists of an array of light cells and has a width equivalent to one cell, and wherein each of said reference optical patterns consists of a matrix of 3×3 cells, and nine of said reference optical patterns.

3. A method as set forth in claim 2, wherein each of the cells of the two-dimensional code is represented in the captured image by a matrix of a plurality of pixels, wherein each of the reference brightness check dot and the surrounding brightness check dots is represented by one pixel, and wherein the alignment symbol optical pattern is formed with a combination of brightness levels of pixels representing the reference brightness check dot and the surrounding brightness check dots, and wherein the brightness level of each of the pixels is determined by considering brightness levels of surrounding pixels.

4. A method as set forth in claim 3, wherein each of the pixels representing the captured image of the two-dimensional code is one of light and dark pixels, and wherein the brightness level of each of the pixels representing the reference brightness check dot and the surrounding brightness check dots is determined based on which of the number of light pixels and the number of dark pixels is greater in an area surrounding the each of the pixels.

5. A method as set forth in claim 4, further comprising the step of determining whether light and dark pixels are mixed in a given area around the reference brightness check dot or not, and wherein if it is determined that the light and dark pixels are mixed in the given area, the reference brightness check dot is shifted by a given distance in a given direction determined based on a geometry and a brightness pattern of said alignment symbol to a place of the captured image of the two-dimensional code where there is no mix of light and dark pixels, after which the brightness level of each of the pixels representing the reference brightness check dot and the surrounding brightness check dots is determined.

6. A method as set forth in claim 5, wherein the given direction in which the reference brightness check dot is shifted is a direction where the number of either of light pixels and dark pixels in the given area around the shifted reference brightness check dot is expected to increase.

7. A method as set forth in claim 5, wherein the given direction in which the reference brightness check dot is shifted is a direction toward one of a collection of light pixels and a collection of dark pixels in a given area around the reference brightness check dot which forms a portion of the intermediate square frame of the two-dimensional code.

8. A method as set forth in claim 5, wherein the given distance by which the reference brightness check dot is shifted is equivalent to a given number of pixels that is identical with a given fraction of one cell.

9. A method as set forth in claim 5, wherein the given distance by which the reference brightness check dot is shifted is equivalent to a given number of pixels that is identical with half a cell.

10. A method as set forth in claim 5, wherein the given distance by which the reference brightness check dot is shifted is equivalent to a given number of pixels regardless of a size of the cells.

11. A method of reading information out of a two-dimensional code which is made up of a matrix of cells having a given optical pattern and which has location symbols used to locate the two-dimensional code and alignment symbols used to locate the cells, a first one of the alignment symbols being provided at a position on the two-dimensional code which is specified in a given positional relation to the location symbols, comprising the steps of:

capturing an image around the two-dimensional code in a bit mapped pattern;

detecting positions of the location symbols to determine a position of the two-dimensional code in the captured image;

calculating a central position of the first alignment symbol in the captured image mathematically using the given positional relation to the location symbols;

calculating a central position of a second one of the alignment symbols in the captured image mathematically using a positional relation to the first alignment symbol and the location symbols;

selecting a dot in the captured image lying at the calculated central position of each of the alignment symbols as a reference brightness check dot and dots lying in some of the cells of the captured image located around one of the cells in which the reference brightness check dot exists as surrounding brightness check dots to define an alignment symbol optical pattern with a combination of the reference brightness check dot and the surrounding brightness check dots;

comparing said alignment symbol optical pattern of each of the alignment symbols with a plurality of reference optical patterns each formed with one of possible combinations of one of the cells lying at an actual central position of each of the alignment symbols and as many cells arranged adjacent the one of the cells as the surrounding brightness check dots to select one of the reference optical patterns matching up with a corresponding one of the alignment symbol optical patterns;

determining a central position of each of the alignment symbols in the captured image based on a position of one of the surrounding brightness check dots corresponding to the one of the cells of the selected matching up reference optical pattern at the actual central position of a corresponding one of the alignment symbols and a geometry of the corresponding one of the alignment symbols;

determining a position of each of the cells of the two-dimensional code in the captured image based on the position of one of the location symbols or the actual central position of one of the alignment symbols located near a corresponding one of the cells in the captured image; and reading the cells of the two-dimensional code in the captured image optically to decode the information carried by the two-dimensional code.

12. A method as set forth in claim 11, further comprising the step of calculating a central position of a third one of the alignment symbols in the captured image mathematically using a positional relation to the first and second alignment symbols.

13. A method as set forth in claim 11, wherein the two-dimensional code also has a format code which is located in a given positional relation to one of the location symbols and which carries information about an arrangement of the alignment symbols in the two-dimensional code, and further comprising the steps of, after the position of the two-dimensional code is determined, detecting the format code based on the positions of the detected location symbols and reading the information out of the format code about the arrangement of the alignment symbols, and wherein the central positions of the alignment symbols are calculated based on the information read out of the format code.

14. A method as set forth in claim 13, wherein the format code also carries information about the number of the cells in the two-dimensional code, and further comprising the steps of, after the position of the two-dimensional code is determined, detecting the format code based on the positions of the detected location symbols and reading the information out of the format code about the number of the cells in the two-dimensional code, and wherein the positions of the cells are determined based about the read information on the number of the cells.

15. A storage medium storing a computer-implemented program for reading information out of a two-dimensional code in a method as set forth in claim 11.

16. A storage medium storing a computer-implemented program for reading information out of a two-dimensional code in a method as set forth in claim 1.

* * * * *